May 17, 1960 P. JORICK, JR 2,936,803

CORNER CLAMP

Filed Oct. 11, 1956

INVENTOR.
Paul Jorick, Jr.
BY
Johnson and Kline
ATTORNEYS

United States Patent Office 2,936,803
Patented May 17, 1960

1

2,936,803

CORNER CLAMP

Paul Jorick, Jr., Stamford, Conn.

Application October 11, 1956, Serial No. 615,294

5 Claims. (Cl. 144—293)

The present invention relates to a novel clamp construction whereby workpieces can be securely held so that the mitered ends thereof forming a corner or the like can be secured together.

While clamping means have been provided for holding mitered ends of workpieces, such as the corners of picture frames and the like, during the setting of the glue joint or for other operations they have been restricted in their use since they have all been limited to connecting mitered ends having 45° angles with respect to the longitudinal axis of the workpiece. No means have been provided, however, for joining together workpieces having other angles, as for example, the ends of the rim of an octagonal table or of a triangular frame in which case the angular relation of the ends with respect to the longitudinal axis is different than the usual 45° angle.

The present invention overcomes this difficulty by providing a novel clamping construction which is adjustable so as to securely hold together the joined mitered ends of workpieces having various angular relations to the longitudinal axis of the workpiece. This is accomplished by providing a pair of clamp means which are pivotally connected and adjustable with respect to one another about the pivot to provide the required angular relationship of the workpieces. While this may be achieved in many ways, in the present preferred form of the invention a base is provided and one of the clamp means is formed integrally with the base on a raised portion of the base. The other clamp means is pivotally mounted so as to overlie the base with the end of its fixed jaw adjacent the end of the fixed jaw of the first clamp. The second clamp is adjustable on the base about the pivot so that the fixed jaws of the clamp can be adjustably positioned with respect to one another so that their clamping surfaces form an angle of between 180° and 359° whereby mitered ends of the workpieces forming an angle of ½° to 90° to the longitudinal axes of the workpieces can be joined.

A feature of the invention resides in the simplicity of the construction, ease of operation and its great versatility.

Other features and advantages of the invention will be apparent from the specification and claims when considered in connection with the drawings in which:

Figures 1, 2, 3:
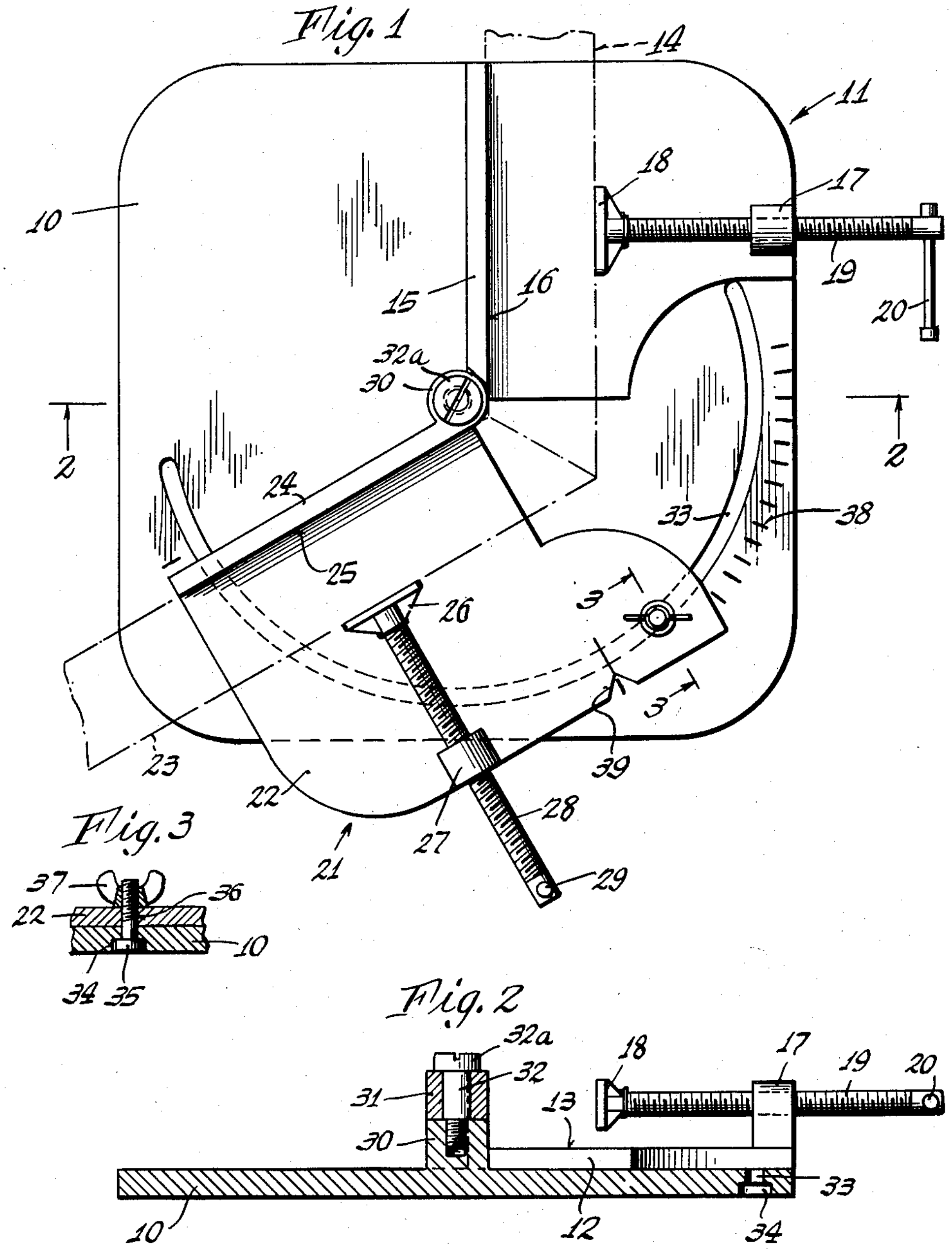
Figure 1 is a plan view of the device.
Fig. 2 is a sectional view taken along lines 2—2 of Fig. 1.
Fig. 3 is a sectional view taken along lines 3—3 of Fig. 1.

As shown in the drawings, the clamp of the present invention comprises a base 10 having a clamp 11 formed integrally therewith in one quadrant thereof. Preferably, the base is provided with a raised portion 12 in this quadrant forming a supporting surface 13 for a workpiece 14 having a mitered end. Projecting above the supporting surface is a fixed jaw 15 having a clamping surface 16 perpendicular to the supporting surface. Adjacent the edge of the base there is raised a lug 17 in which is adjustably mounted a movable jaw 18 adapted to be moved toward and away from the fixed jaw to clamp a workpiece therein. While the movable jaw may be moved by any suitable means, it is herein illustrated 2 as being moved by means of a screw 19 operating in the threaded bore in the lug. A suitable operating means 20 is provided for the screw so as to move the movable jaw into engagement with the workpiece and clamp it against the clamping surface 16 of the fixed jaw.

In accordance with the present invention a second clamp 21 is mounted to overlie the base. The clamp has a supporting surface 22 which is adapted to support a second workpiece 23 having a mitered end, said surface being in the same plane as the supporting surface 13 of the first clamp and provided at its rear edge with an integral upstanding wall or fixed jaw 24 having a clamping surface 25 perpendicular to the supporting surface 22. The second clamp is also provided with a movable jaw 26 movable toward or away from the fixed jaw. As herein illustrated, the second clamp is provided with a lug 27 and the jaw is moved by means of a threaded screw 28 operating in the lug and actuated by a suitable operating means 29 so as to engage and clamp the workpiece against the clamping surface 25 of the fixed jaw 24.

A feature of the invention resides in the fact that the two clamps are correlated and hingedly connected and can be adjustably positioned to support workpieces having mitered ends formed by angular end portions having various angular relations to the longitudinal axes of the workpieces. While this may take many forms, in the herein illustrated form of the invention the hinge means is provided by forming a boss 30 on the end of the raised portion and by providing a projecting boss 31 on the end of the second clamp to overlie the first boss and be secured thereto by a pivot pin 32 threaded into the lower boss as shown in Fig. 2 with the head 32*a* overlying the upper boss and securing the second clamp to the base.

It will be seen in Fig. 1 that the clamping surfaces of the fixed jaws 15 and 24 terminate adjacent the bosses 30, 31 and are tangential thereto so that the workpieces are supported by the surfaces 15 and 24 adjacent the joint being formed and without interference by the pivot means for all positions of adjustment. The clamps can be adjusted from a position wherein their clamping surfaces form an angle of 180° with one another to a position in which the clamping jaws are substantially in back to back relation and the clamping surfaces form an angle between them of 359°. With this construction it will be readily apparent that by simply adjusting the position of the second clamp with respect to the first clamp the mitered ends of workpieces forming angles of between ½° to 90° to the longitudinal axes of the workpieces can be joined.

The two clamps can be secured in adjusted position in many ways. In the herein illustrated form of the invention this is accomplished by providing an arcuate slot 33 in the base concentric with the pivot. The slot is countersunk on its undersurface at 34, as shown in Figs. 2 and 3, and a headed bolt 35 is extended through the slot with its head in the countersink and passes through an aperture 36 in the second clamp and a wing nut 37 is threaded on a bolt to lock the second clamp in any adjusted position.

It will be seen, therefore, that by simply releasing the wing nut 37, the second clamp can be adjusted with respect to the first clamp so as to properly position the clamps for the required mitered joint. To facilitate the positioning of the second clamp, suitable indicia 38 can be provided on the base to cooperate with a notch 39 on the clamp to indicate the various relative angular positions of the second clamp to the first clamp.

It will be seen, therefore, that the clamp of the present invention is simple to construct, easy to operate and very versatile in that it will accommodate a wide range of angles forming the mitered joints so as to securely hold the mitered ends together while the glue joint is being set or for such other operations that may be required.

Variations and modifications may be made within the scope of the claims and portions of the improvements may be used without others.

I claim:

1. A clamp for use in joining mitered ends of two workpieces comprising a first clamp having clamping means thereon including a fixed clamping jaw having a clamping surface and a movable clamping jaw to engage and clamp a workpiece against the clamping surface of the fixed jaw; a second clamp having clamping means thereon including a fixed clamping jaw having a clamping surface and a movable clamping jaw to engage and clamp a second workpiece against the clamping surface of the fixed jaw of the second clamp; means hingedly connecting the two clamps together for pivotal movement in a single plane, the clamping surface of said fixed clamping jaws being tangential to the hinged connection and said hinged connection permitting the two clamps to be adjustably positioned with their fixed clamping surfaces forming an angle with one another of between 180° and 359° whereby mitered ends of workpieces forming angles of between ½° to 90° to the longitudinal axes of the workpieces can be joined; and means for locking said clamps in adjusted position.

2. A clamp for use in joining mitered ends of two workpieces comprising a first clamp having a supporting surface adapted to support a workpiece, and clamping means thereon including a fixed clamping jaw having a clamping surface perpendicular to said supporting surface, a movable clamping jaw, and means to move the jaw toward the fixed jaw to engage and clamp the workpiece against the clamping surface of the fixed jaw; a second clamp having a supporting surface adapted to support a workpiece, and clamping means thereon including a fixed clamping jaw having a clamping surface perpendicular to said supporting surface adapted to support a second workpiece thereon, a movable clamping jaw, and means to move the jaw toward said fixed clamping jaw to engage and clamp said second workpiece against the fixed jaw of the second clamp; means hingedly connecting the ends of the two clamps with the supporting surfaces lying in the same plane and the clamping surfaces of the fixed jaws being tangential to said hinge means, said hinged connection comprising overlying bosses on the ends of said fixed jaws and a hinge pin extending therethrough and permitting the two clamps to be adjustably positioned with their fixed clamping surfaces forming an angle with one another of between 180° and 359° whereby mitered ends of workpieces forming angles of between ½° to 90° to the longitudinal axes of the workpieces can be joined; and means for locking said clamps in adjusted position.

3. A clamp for use in joining mitered ends of two workpieces comprising a base, said base having a fixed raised portion forming a supporting surface adapted to support a workpiece; a fixed clamping jaw extending upwardly from said supporting surface and having a clamping surface perpendicular to said supporting surface; a movable clamping jaw mounted on said base and movable to engage and clamp the workpiece against the clamping surface of the fixed jaw; a second clamp mounted on said base to overlie and be slidably supported thereon adjacent said raised portion and having a supporting surface adapted to support a workpiece, said second clamp having a fixed clamping jaw projecting upwardly therefrom and provided with a clamping surface perpendicular to the supporting surface thereon, and a movable clamping jaw mounted thereon and movable to engage and clamp a second workpiece against the clamping surface of the fixed jaw; means pivotally mounting the second clamp on the base with the ends of the two fixed clamping jaws adjacent one another and the clamping surfaces thereof tangential to the pivotal mounting and the supporting surfaces lying in the same plane, said pivotal mounting permitting the two clamps to be adjustably positioned with their fixed clamping surfaces forming an angle with one another of between 180° and 359° whereby mitered ends of workpieces forming angles of between ½° to 90° to the longitudinal axes of the workpieces can be joined; and means for locking said clamps in adjusted position.

4. A clamp for use in joining mitered ends of two workpieces comprising a base, said base having a raised portion forming a supporting surface adapted to support a workpiece; a fixed clamping jaw extending upwardly from said supporting surface and having a clamping surface perpendicular to said supporting surface and a movable clamping jaw mounted on said base and movable to engage and clamp the workpiece against the clamping surface of the fixed jaws; a second clamp overlying said base adjacent said raised portion and having a supporting surface adapted to support a workpiece, said second clamp having a fixed clamping jaw projecting upwardly therefrom and provided with a clamping surface perpendicular to the supporting surface thereon and a movable clamping jaw mounted thereon and movable to engage and clamp a second workpiece against the clamping surface of a fixed jaw; means pivotally mounting the second clamp on the base with the ends of the two fixed clamping jaws adjacent one another with the fixed clamping surfaces thereof perpendicular to the supporting surfaces and tangential to the pivotal mounting and the supporting surfaces lying in the same plane, said pivotal mounting permitting the two clamps to be adjustably positioned with their fixed clamping surfaces forming an angle with one another whereby mitered ends of workpieces can be joined, said base having an arcuate slot concentric with the pivotal mounting with the length of the slot defining the range of angular adjustment of the second clamp on the base; locking means carried by the second clamp and extending through said slot for locking said clamps in adjusted position; and index means comprising an arcuate scale along said slot and a marker on said clamp cooperative with said scale to define the adjusted angular position thereof.

5. A clamping device for holding two workpieces together in angular relationship; said device comprising a pair of plates, each plate having a flat surface for supporting a workpiece and a fixed jaw upstanding from the surface and arranged transversely thereof at one end and having a sleeve upstanding from the surface at the other end, said sleeve having an internally threaded bore arranged normal to the jaw, a screw shaft threaded in each sleeve, a movable jaw mounted on the inner end of each shaft and disposed in confronting relation with a fixed jaw to clamp a workpiece thereagainst, each plate having an offset at the corner of the end having the fixed jaw, said offsets being arranged in overlapping relation with the surfaces of the plates disposed coplanar, means joining the offsets for relative rotational movement so that the plates are movable from a side-by-side position to an end-to-end position, means for locking the plates in selected angular positions, gauge means disposed concentric to the rotational axis of the offsets and carried by one of the plates and an indicator carried by the other of the plates and cooperatively arranged with the gauge means.

References Cited in the file of this patent

UNITED STATES PATENTS

| | | |
|---|---|---|
| 172,955 | Benjamin | Feb. 1, 1876 |
| 534,647 | Harold | Feb. 26, 1895 |
| 565,652 | Walter et al. | Aug. 11, 1896 |
| 590,979 | Hall | Oct. 5, 1897 |

FOREIGN PATENTS

| | | |
|---|---|---|
| 17,239 | Great Britain | Sept. 27, 1892 |